(12) United States Patent
MacDonald et al.

(10) Patent No.: US 6,293,589 B1
(45) Date of Patent: Sep. 25, 2001

(54) SEAT BELT ADJUSTABLE DEVICE AND METHOD OF USING THE SAME

(76) Inventors: Lionel MacDonald, 310 Windflower Way, Oceanside, CA (US) 92057; Lionel E. MacDonald, Jr., 4968 Bella Collina St., Oceanside, CA (US) 92056

( * ) Notice: Subject to any disclaimer, the term of this patent is extended or adjusted under 35 U.S.C. 154(b) by 0 days.

(21) Appl. No.: 09/551,922

(22) Filed: Apr. 19, 2000

(51) Int. Cl.[7] .............................. B60R 22/10; B60R 22/30
(52) U.S. Cl. ............................................ 280/808; 297/483
(58) Field of Search .............................. 280/808, 801.1; 297/483, 482

(56) References Cited

U.S. PATENT DOCUMENTS

| | | |
|---|---|---|
| 4,786,078 * | 11/1988 | Schreier et al. ............. 280/808 |
| 4,893,835 | 1/1990 | Linden . |
| 5,154,446 | 10/1992 | Blake . |
| 5,169,174 | 12/1992 | Gray . |
| 5,201,099 | 4/1993 | Campbell . |
| 5,215,333 | 6/1993 | Knight . |
| 5,255,940 | 10/1993 | Kornblum et al. . |
| 5,265,910 | 11/1993 | Barr et al. . |
| 5,308,116 | 5/1994 | Zawisa et al. . |
| 5,335,957 * | 8/1994 | Golder ........................ 297/483 |
| 5,340,198 | 8/1994 | Murphy et al. . |
| 5,421,614 * | 6/1995 | Zheng ........................ 280/808 |

* cited by examiner

*Primary Examiner*—Peter C. English
(74) *Attorney, Agent, or Firm*—Lyon & Lyon LLP

(57) ABSTRACT

The present invention relates to an adjustment device for a vehicle seat belt system designed to adjust the angular inclination and position of the shoulder belt portion for a safer and more comfortable fit for a seat belt user. The adjustment device includes a detachable sleeve which wraps around both the lap belt and the shoulder belt and angled slots in the sleeve that the shoulder belt portion exits through. During use, the shoulder belt portion enters one side of the sleeve in parallel with the lap belt portion then bends upwardly and exits the sleeve through the slots at an angle. The bent shoulder belt portion passing through the slots creates friction and prevents unwanted lateral displacement of the sleeve and shoulder belt portion.

25 Claims, 1 Drawing Sheet

SEAT BELT ADJUSTABLE DEVICE AND METHOD OF USING THE SAME

BACKGROUND OF THE INVENTION

1. Field of the Invention

The present invention relates, in general, to an auxiliary device that attaches to a vehicle seat belt, and, in particular, to an auxiliary device for adjusting the position of the shoulder portion of the vehicle seat belt for a more comfortable and safer fit for the seat belt wearer.

2. Discussion of Related Art

Three-point seat belt systems have been well known in the automobile safety industry for many years. Three-point systems typically include a lap belt portion and a shoulder belt portion. A problem with such types of seat belts is that the shoulder belt portion often rides to close to the neck of a smaller seat belt wearer. This tends to be uncomfortable and can be dangerous in the event of a collision or sudden stop.

U.S. Pat. No. 5,215,333 to Knight discloses a seat belt adjustment band that can be placed around a lap belt portion and shoulder belt portion and moved over the lap belt portion and shoulder belt portion, across a belt wearer's lap, in order to adjust the position of the shoulder belt portion with respect to the user. Although this adjustment band is capable of repositioning the location of the shoulder belt portion, this is often only temporary because the way the adjustment band is designed causes it to become displaced from its originally set position. Once the adjustment band is moved laterally to a new location, nothing prevents the shoulder belt portion from slipping back to its former, uncomfortable position.

Accordingly, a need exists for a seat belt adjustment device that maintains its position once it is adjusted to a desired lateral location along the lap belt portion of a three-point seat belt system.

SUMMARY OF THE INVENTION

This problem and others are addressed and solved by the present invention. The present invention involves a sleeve adapted to be placed around the lap belt portion and shoulder belt portion of a three-point seat belt system. The sleeve is adapted to be displaced laterally along the lap belt portion in order to adjust the shoulder strap to a safe and comfortable position for an individual belt wearer. Unlike earlier seat belt adjustment devices, the instant device has a unique means to prevent displacement of the shoulder belt portion once a desired position is established. The sleeve includes an angled slot through which the shoulder strap portion is adapted to pass through. In use, the shoulder belt portion enters one side of the sleeve in parallel with the lap belt portion, and bends upwardly through the slot at an angle of about 45 degrees. The bent shoulder strap portion through the slot is highly effective at preventing unintended lateral displacement of the sleeve once the position of the shoulder strap portion is established.

Other features and advantages of the invention will be evident from reading the following detailed description, which is intended to illustrate, but not limit, the invention.

BRIEF DESCRIPTION OF DRAWINGS

The drawings illustrate both the design and utility of a preferred embodiment of the present invention, in which.

DETAILED DESCRIPTION OF PREFERRED EMBODIMENT

Figure 1:
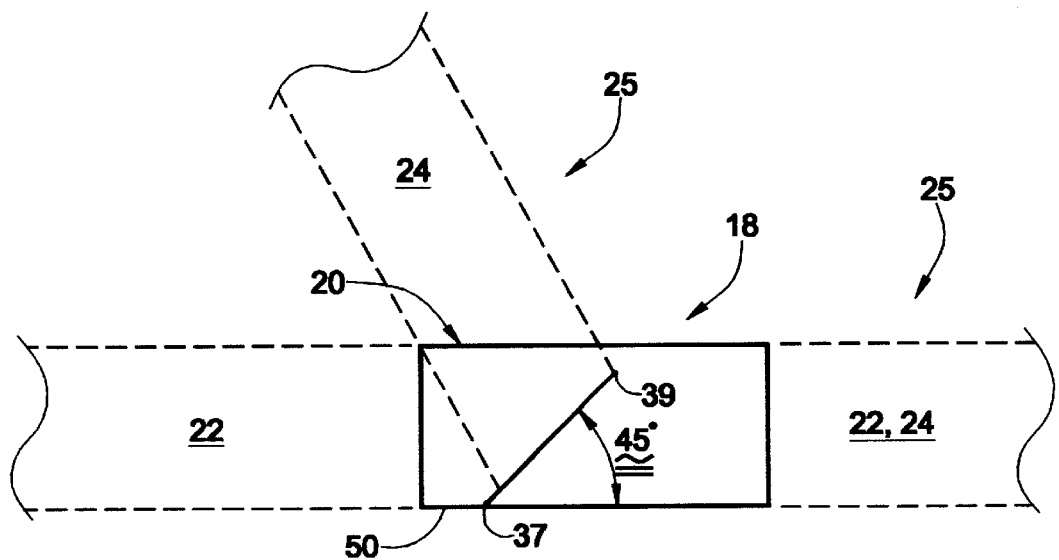
FIG. 1 is a perspective view of a seat belt adjustment apparatus constructed in accordance with a preferred embodiment of the present invention shown in conjunction with a passenger-side three-point seat belt system.

With reference to FIGS. 1–4, a seat belt adjustment device 18 constructed in accordance with a preferred embodiment of the invention will now be described. The seat belt adjustment device 18 includes a seat belt adjustment sleeve 20 adapted to encircle both the lap belt portion 22 and the shoulder belt portion 24 of a three point seat belt system 25. The sleeve 20 includes angled slots 32, 34 dimensioned for the passage of the shoulder belt portion 24 therethrough. The slots 32, 34 are oriented such that when the sleeve 20 is in use, the slots 32, 34 are aligned and are substantially perpendicular with the normal orientation of the shoulder belt 24 across the torso of a seat belt wearer or user.

FIG. 1 is a front perspective view (facing a passenger-side user) of the seat belt adjustment device 18 in use with the lap belt portion 22 and the shoulder belt portion 24 of a standard three-point seat belt system 25. From this perspective, the slots 32, 34 extend from a lower left point 37 on the sleeve 20 to an upper right point 39 on the sleeve 20. In a driver-side version of the seat belt adjustment device 18, the slots 32, 34 may be oriented in an opposite manner, from a lower right point on the sleeve 20 to an upper left point on the sleeve 20.

Figure 2:
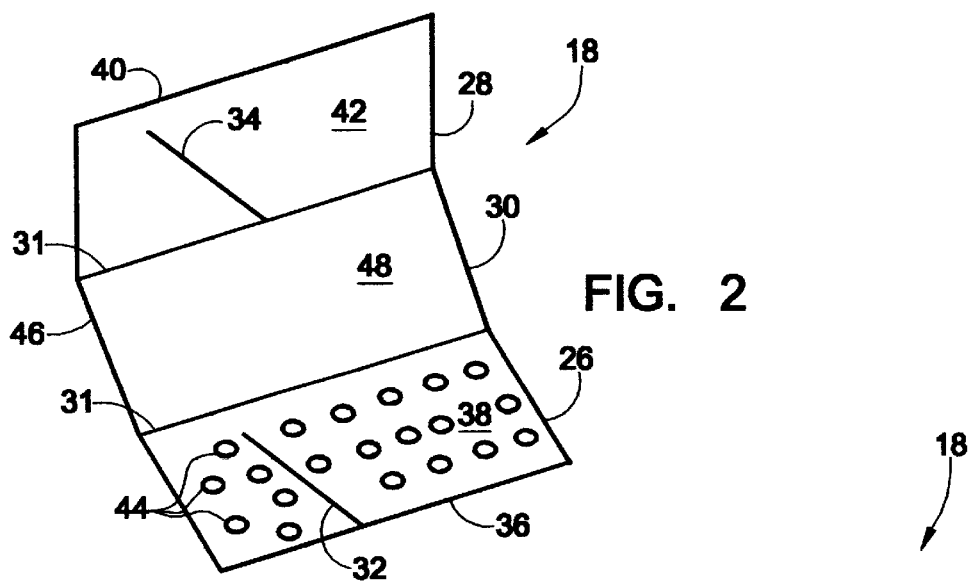
FIG. 2 is a perspective view of the seat belt adjustment apparatus illustrated in FIG. 1 in an unfolded or disassembled condition.

FIG. 2 is an illustration of the sleeve 20 in a fully unfolded or disassembled condition. The sleeve 20 is preferably made of an imitation leather and may include company logos or animated characters such as DISNEY™ cartoons attached thereto. The sleeve 20 may also be made of other materials such as, without limitation, leather, suede, nylon and cotton. The sleeve 20 includes three generally planar sections, a first section 26 with an angled slot 32, a second section 28 with an angled slot 34, and an intermediate section 30. The first and second sections 26, 28 are foldably connected to the intermediate section 30 at fold lines 31. The first section 26 has an outer side 36 and an inner side 38, the second section 28 has an outer side 40 and an inner side 42, and the intermediate section has an outer side 46 and an inner side 48.

Both the inner side 38 of the first section 26 and the outer side 40 of the second section 28 have hook and loop fastening means 44 (VELCRO™) sewn thereon for holding the sleeve 20 in a folded or assembled condition in place around the lap belt portion 22 and shoulder belt portion 24. When the hook and loop fastening means 44 from the inner side 38 of the first section 26 and the outer side 40 of the second section 28 are engaged, the slots 32, 34 are aligned so that the shoulder belt portion 24 can pass therethrough.

In use, the shoulder belt portion 24 enters one side of the sleeve 20 in parallel with the lap belt portion 22 then bends upwardly and exits the sleeve 20 through the slots 32, 34 at an angle of about 45 degrees with respect to the bottom 50 of the seat belt adjustment device 18. Although in a preferred embodiment, the angle of the slots 32, 34 is about 45 degrees, it will be readily apparent to those skilled in the art that the slots may be oriented at different angles other than about 45 degrees. The bent shoulder belt 24 passing through the angled slots 32, 34 creates substantially more friction and resistance to movement than that which would exist if the lap and shoulder belt portions 22, 24 were disposed in the manner shown in U.S. Pat. No. 5,215,333, preventing unwanted lateral displacement of the sleeve 20 and shoulder belt portion 24.

Figures 3, 4:
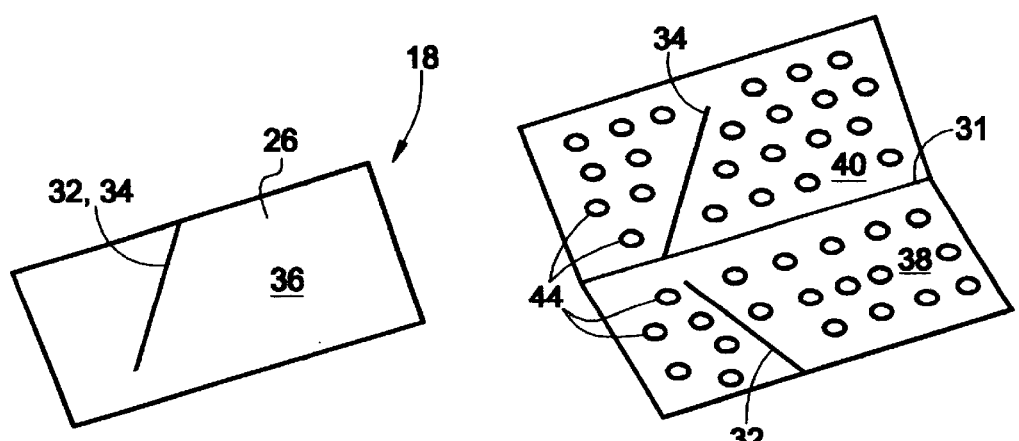
FIG. 3 is a perspective view of the seat belt adjustment apparatus illustrated in FIG. 1 in a partially folded or assembled condition.
FIG. 4 is a perspective view of the seat belt adjustment apparatus illustrated in FIG. 1 in a completely folded or assembled condition.

The seat belt adjustment device is easy to install on a standard three-piece vehicle seat belt system 25. Initially, the sleeve 20 is opened to the unfolded or disassembled configuration depicted in FIG. 2. Then, both the lap belt portion 22 and the shoulder belt portion 24 are positioned flat against the inner side 48 of the intermediate section 30 adjacent the inner side 38 of the first section 26 so that the lap belt portion 22 is sandwiched between the intermediate section 30 and the shoulder belt portion 24. Next, the second section 28 is folded until it abuts the shoulder belt portion 24 such that the hook and loop fasteners 44 are adjacent to one another, as depicted in FIG. 3.

At this point, the shoulder belt portion 24 is positioned upwardly through the second slot 34 and the first section 26 is folded toward the outer side 40 of the second section 28. During this step, the first slot 32 is aligned with the second slot 34 and the hook and loop fasteners 44 are connected, resulting in the folded or assembled configuration depicted in FIG. 4. After attaching the seat belt adjustment device 18 to the lap belt portion 22 and shoulder belt portion 24, the device 18 can easily be slid along the lap belt 22, enabling a user to adjust the angular inclination and position of the shoulder belt 24 for maximum safety and comfort.

While a preferred embodiment and method have been shown and described, it will be apparent to one of ordinary skill in the art that numerous alterations may be made without departing from the spirit or scope of the invention. Therefore, the invention is not to be limited except in accordance with the following claims.

What is claimed is:

1. A seat belt adjustment device for use with a seat belt system, said seat belt system including a lap belt portion and a shoulder belt portion, said seat belt adjustment device comprising:
    a sleeve adapted to encircle said lap belt portion and said shoulder belt portion of said seat belt system;
    a pair of slots passing through a portion of said sleeve and oriented approximately 45 degrees with respect thereto, said slots being dimensioned for the passage of said shoulder belt portion of said seat belt system therethrough.

2. A seat belt adjustment device according to claim 1, wherein said slots are oriented so that, when said seat belt adjustment device is in use, the slots are substantially perpendicular with the normal orientation of said shoulder belt portion across the torso of the user.

3. A seat belt adjustment device according to claim 1, wherein said sleeve includes a first section having a slot angled at substantially 45 degrees with respect to the length of said sleeve, a second section having a slot angled at approximately 45 degrees with respect to the length of said sleeve and an intermediate section foldably connected to said first section and second section, wherein when said adjustment device is assembled, said slots are aligned and dimensioned for the passage of said shoulder belt portion therethrough.

4. A seat belt adjustment device according to claim 3, wherein said seat belt adjustment device is adapted for use with a driver or driver-side passenger and when looking at the user with the adjustment device in use, said slots extend from a lower right point on the sleeve to an upper left point on the sleeve.

5. A seat belt adjustment device according to claim 4, wherein said slots are aligned and dimensioned for the passage of the shoulder belt portion such that the shoulder belt portion is adapted to enter the left side of said sleeve in parallel with the lap belt portion then exit said sleeve through said slots upwardly at an angle of about 45 degrees.

6. A seat belt adjustment device according to claim 3, wherein said seat belt adjustment device is adapted for use with a passenger-side passenger and when looking at the user with the adjustment device in use, said slots extend from a lower left point on the sleeve to an upper right point on the sleeve.

7. A seat belt adjustment device according to claim 6, wherein said slots are aligned and dimensioned for the passage of the shoulder belt portion such that the shoulder belt portion is adapted to enter the right side of said sleeve in parallel with the lap belt portion then exit said sleeve through said slots upwardly at an angle of about 45 degrees.

8. A seat belt adjustment device for use with a seat belt system, said seat belt system including a lap belt portion and a shoulder belt portion, said seat belt adjustment device comprising:
    a sleeve adapted to encircle said lap belt portion and said shoulder belt portion and secure said lap belt portion to said shoulder belt portion in a parallel configuration;
    said sleeve including a first section having a slot angled at substantially 45 degrees with respect to the length of said sleeve, a second section having a slot angled at substantially 45 degrees with respect to the length of said sleeve and an intermediate section foldably connected to said first section and second section, wherein when said adjustment device is assembled, said slots are aligned and dimensioned for the passage of said shoulder belt portion therethrough;
    said first section of said sleeve having an outer side and an inner side having a first attachment mechanism thereon; said second section of said sleeve having an outer side including a second attachment mechanism thereon and an inner side, said inner side of said first section being configured to releasably attach to said outer side of said second section in a parallel relationship.

9. A seat belt adjustment device according to claim 8, wherein said slots are oriented so that, when said seat belt adjustment device is in use, the slots are substantially perpendicular with the normal orientation of said shoulder belt portion across the torso of the user.

10. A seat belt adjustment device according to claim 8, wherein said seat belt adjustment device is adapted for use with a driver or driver-side passenger and when looking at the user with the adjustment device in use, said slots extend from a lower right point on the sleeve to an upper left point on the sleeve.

11. A seat belt adjustment device according to claim 10, wherein said slots are aligned and dimensioned for the passage of the shoulder belt portion such that the shoulder belt portion is adapted to enter the left side of said sleeve in parallel with the lap belt portion then exit said sleeve through said slots upwardly at an angle of about 45 degrees.

12. A seat belt adjustment device according to claim 8, wherein said seat belt adjustment device is adapted for use with a passenger-side passenger and when looking at the user with the adjustment device in use, said slots extend from a lower left point on the sleeve to an upper right point on the sleeve.

13. A seat belt adjustment device according to claim 12, wherein said slots are aligned and dimensioned for the passage of the shoulder belt portion such that the shoulder belt portion is adapted to enter the right side of said sleeve in parallel with the lap belt portion then exit said sleeve through said slots upwardly at an angle of about 45 degrees.

14. A seat belt adjustment device according to claim 8, wherein said first and second attachment mechanisms are hook and loop fasteners attached to the first and second sections by stitching.

15. A seat belt adjustment device according to claim 8, wherein said sleeve is made from imitation leather.

16. A method of using a seat belt adjustment device including a removable sleeve to adjust the position of a three-point vehicle seat belt for a more comfortable and safer fit for a seat belt wearer; said three-point vehicle seat belt including a lap belt portion and a shoulder belt portion; said method comprising the steps of:

positioning said lap belt portion and said shoulder belt portion horizontally within said sleeve;

bending said shoulder belt portion upwardly through a pair of slots in said sleeve; and sliding said sleeve laterally along said lap belt portion to adjust the angular inclination and position of said shoulder belt portion.

17. A method according to claim 16, wherein said slots are oriented so that, when said seat belt adjustment device is in use, the slots are substantially perpendicular with the normal orientation of said shoulder belt portion across the torso of the user.

18. A method according to claim 16, wherein said sleeve includes a first section having a slot angled at substantially 45 degrees with respect to the length of said sleeve, a second section having a slot angled at approximately 45 degrees with respect to the length of said sleeve and an intermediate section foldably connected to said first section and second section, wherein when said adjustment device is assembled, said slots are aligned and dimensioned for the passage of said shoulder belt portion therethrough.

19. A method according to claim 18, wherein said seat belt adjustment device is adapted for use with a driver or driver-side passenger and when looking at the user with the adjustment device in use, said slots extend from a lower right point on the sleeve to an upper left point on the sleeve.

20. A method according to claim 19, wherein said slots are aligned and dimensioned for the passage of the shoulder belt portion such that the shoulder belt portion is adapted to enter the left side of said sleeve in parallel with the lap belt portion then exit said sleeve through said slots upwardly at an angle of about 45 degrees.

21. A method according to claim 18, wherein said seat belt adjustment device is adapted for use with a passenger-side passenger and when looking at the user with the adjustment device in use, said slots extend from a lower left point on the sleeve to an upper right point on the sleeve.

22. A method according to claim 21, wherein said slots are aligned and dimensioned for the passage of the shoulder belt portion such that the shoulder belt portion is adapted to enter the right side of said sleeve in parallel with the lap belt portion then exit said sleeve through said slots upwardly at an angle of about 45 degrees.

23. A method according to claim 18, wherein said first section of said sleeve has an outer side and an inner side having a first attachment mechanism thereon; said second section of said sleeve having an outer side including a second attachment mechanism thereon and an inner side, said inner side of said first section being configured to releasably attach to said outer side of said second section in a parallel relationship.

24. A method according to claim 23, wherein said first and second attachment mechanisms are hook and loop fasteners attached to the first and second members by stitching.

25. A method according to claim 24, wherein said sleeve is made from imitation leather.

* * * * *